US011063901B2

(12) United States Patent
Nakamura et al.

(10) Patent No.: US 11,063,901 B2
(45) Date of Patent: Jul. 13, 2021

(54) MANUFACTURING LINE COMPUTER SYSTEM AND NETWORK SETUP METHOD OF THE SAME

(71) Applicant: Sony Interactive Entertainment Inc., Tokyo (JP)

(72) Inventors: Takashi Nakamura, Chiba (JP); Tsutomu Hoshi, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 165 days.

(21) Appl. No.: 15/961,052

(22) Filed: Apr. 24, 2018

(65) Prior Publication Data
US 2018/0332002 A1 Nov. 15, 2018

(30) Foreign Application Priority Data

May 10, 2017 (JP) .............................. JP2017-093603

(51) Int. Cl.
*H04L 29/12* (2006.01)
*G06Q 50/04* (2012.01)
(Continued)

(52) U.S. Cl.
CPC ........ *H04L 61/2503* (2013.01); *G05B 19/418* (2013.01); *G06Q 10/00* (2013.01);
(Continued)

(58) Field of Classification Search
CPC ............. H04L 61/2503; H04L 12/4641; H04L 61/6068; H04L 12/4675; G05D 1/10088; G05B 19/418; G06Q 50/04
See application file for complete search history.

(56) References Cited

U.S. PATENT DOCUMENTS

| 6,453,210 B1 * | 9/2002 | Belotserkovskiy .... G06Q 10/06 700/96 |
| 6,873,602 B1 | 3/2005 | Ambe |

(Continued)

FOREIGN PATENT DOCUMENTS

| CN | 1533535 A | 9/2004 |
| CN | 1871821 A | 11/2006 |

(Continued)

OTHER PUBLICATIONS

Extended European Search Report for corresponding EP Application No. 18168891.2, 8 pages, dated Sep. 18, 2018.
(Continued)

*Primary Examiner* — Dhairya A Patel
(74) *Attorney, Agent, or Firm* — Matthew B. Dernier, Esq.

(57) ABSTRACT

Disclosed herein is a manufacturing line computer system including: first and second computers. The first computer includes a storage section adapted to store a template that associates role information of the second computer and a network address of the second computer; and a reply section adapted to return the network address of the second computer associated with the role information to the second computer in response to reception of the role information from the second computer. The second computer includes an input section adapted to input the role information of the second computer; a transmission section adapted to send the input role information of the second computer to the first computer; and a network address setup section adapted to specify the network address, returned from the first computer, for the second computer.

17 Claims, 5 Drawing Sheets

(51) Int. Cl.
    *G05B 19/418*     (2006.01)
    *H04L 12/46*     (2006.01)
    *G06Q 10/00*     (2012.01)

(52) U.S. Cl.
    CPC ......... *G06Q 50/04* (2013.01); *H04L 12/4625* (2013.01); *H04L 12/4675* (2013.01); *H04L 61/103* (2013.01); *H04L 61/2007* (2013.01); *H04L 61/6022* (2013.01); *H04L 61/6068* (2013.01); *H04L 12/4641* (2013.01)

(56) References Cited

U.S. PATENT DOCUMENTS

| | | | |
|---|---|---|---|
| 7,752,202 | B2 | 7/2010 | Kobori |
| 8,543,233 | B2 | 9/2013 | Donati |
| 8,934,116 | B2 | 1/2015 | Umekage |
| 9,201,704 | B2 | 12/2015 | Chang |
| 9,838,302 | B1 * | 12/2017 | Sears ...................... H04L 45/28 |
| 10,432,467 | B2 * | 10/2019 | Harneja ............... H04L 41/0873 |
| 10,764,294 | B1 * | 9/2020 | Wasiq ..................... H04L 63/08 |
| 2004/0172376 | A1 | 9/2004 | Kobori |
| 2007/0081541 | A1 * | 4/2007 | Umekage ............ H04L 12/4641 370/395.2 |
| 2008/0034077 | A1 * | 2/2008 | Takashige .............. G06Q 10/06 709/223 |
| 2010/0287879 | A1 | 11/2010 | Donati |
| 2011/0010770 | A1 * | 1/2011 | Smith ................... H04L 9/3213 726/18 |
| 2012/0254836 | A1 * | 10/2012 | Storer ....................... G06F 8/70 717/121 |
| 2013/0044636 | A1 | 2/2013 | Koponen |
| 2013/0201978 | A1 | 8/2013 | Iyer |
| 2013/0268643 | A1 | 10/2013 | Chang |
| 2015/0112944 | A1 * | 4/2015 | Wu ..................... G06F 11/2097 707/652 |
| 2016/0248869 | A1 * | 8/2016 | Allen ...................... H04L 45/74 |
| 2016/0364649 | A1 * | 12/2016 | Ding ........................ G05B 13/04 |
| 2017/0272328 | A1 * | 9/2017 | Kinomoto ............... H04L 41/22 |
| 2018/0145879 | A1 * | 5/2018 | Cook .................. H04L 12/4641 |
| 2018/0287996 | A1 * | 10/2018 | Tripathy ............. H04L 61/2503 |
| 2019/0126775 | A1 * | 5/2019 | Han ........................ B60L 58/13 |

FOREIGN PATENT DOCUMENTS

| | | |
|---|---|---|
| CN | 101424941 A | 5/2009 |
| CN | 103368807 A | 10/2013 |
| CN | 104951888 A | 9/2015 |
| JP | 2005101722 A | 4/2005 |
| JP | 2007221553 A | 8/2007 |
| JP | 2008035456 A | 2/2008 |
| JP | 2011508327 A | 3/2011 |
| KR | 20120000171 A | 1/2012 |
| WO | 0186906 A2 | 11/2001 |
| WO | 2009083595 A1 | 7/2009 |

OTHER PUBLICATIONS

Notification of Reason for Refusal for corresponding JP Application No. 2017-093603, 11 pages, dated Apr. 16, 2019.
The First Office Action for corresponding CN Application No. 201810413149, 18 pages, dated Jul. 27, 2020.
The Second Office Action for corresponding CN Application No. 201810413149.0, 19 pages, dated Mar. 1, 2021.

* cited by examiner

FIG. 2

| PROCESS | ROLE INFO | HOST ADDRESS | VLAN_1 10.1.1. | VLAN_2 10.1.2. | VLAN_3 10.1.3. |
|---|---|---|---|---|---|
| COMMON TO ALL PROCESSES | LINE CONTROLLER | 1 | O | O | |
| SOLDERING/ASSEMBLY 1 | PRODUCTION MANAGING PC 1 | 11 | O | | |
| DATA WRITE | DATA WRITING PC 1 | 12 | O | O | |
| | DATA WRITING PC 2 | 13 | O | O | |
| | DATA WRITING PC 3 | 14 | O | O | |
| | LABEL PRINTER | 15 | O | | |
| | ROBOT ARM 1 | 16 | | O | |
| | ROBOT MONITOR 1 | 17 | | O | |
| | CONVEYOR CONTROLLER 1 | 18 | | O | |
| ASSEMBLY 2 | CAMERA PC 1 | 31 | O | O | O |
| | CAMERA PC 2 | 32 | O | O | O |
| | IMAGE RECOGNITION CAMERA 1 | 33 | | | O |
| | IMAGE RECOGNITION CAMERA 2 | 34 | | | O |
| | ROBOT ARM 2 | 35 | | O | |
| | ROBOT ARM 3 | 36 | | O | |
| | ROBOT ARM 4 | 37 | | O | |
| | ROBOT MONITOR 2 | 38 | | O | |
| | ROBOT MONITOR 3 | 39 | | O | |
| | ROBOT MONITOR 4 | 40 | | O | |
| | CONVEYOR CONTROLLER 2 | 41 | | O | |
| INSPECTION | DATA WRITING PC 4 | 51 | O | O | |
| | DATA WRITING PC 5 | 52 | O | O | |
| | INSPECTION PC 1 | 53 | O | O | |
| | INSPECTION PC 2 | 54 | O | O | |
| | ROBOT ARM 5 | 55 | | O | |
| | ROBOT ARM 6 | 56 | | O | |
| | ROBOT MONITOR 5 | 57 | | O | |
| | ROBOT MONITOR 6 | 58 | | O | |
| | CONVEYOR CONTROLLER 3 | 59 | | O | |
| PACKAGING | PRODUCTION MANAGING PC 2 | 71 | O | O | |
| | PACKAGING PC 1 | 72 | O | O | |
| | PACKAGING PC 2 | 73 | O | O | |
| | PRODUCTION MANAGING PC 3 | 74 | O | O | |
| | CONVEYOR CONTROLLER 4 | 75 | | O | |

NETWORK ADDRESS

F I G. 3

| PROCESS | ROLE INFO | HOST ADDRESS | VLAN 10.1.1. |
|---|---|---|---|
| COMMON TO ALL PROCESSES | LINE CONTROLLER | 1 | ◯ |
| SOLDERING/ASSEMBLY 1 | PRODUCTION MANAGING PC 1 | 11 | ◯ |
| | CONVEYOR CONTROLLER 1 | 12 | ◯ |
| DATA WRITE | DATA WRITING PC 1 | 21 | ◯ |
| | DATA WRITING PC 2 | 22 | ◯ |
| | DATA WRITING PC 3 | 23 | ◯ |
| | LABEL PRINTER | 24 | ◯ |
| | CONVEYOR CONTROLLER 2 | 25 | ◯ |
| | DATA WRITING PC 4 | 31 | ◯ |
| | DATA WRITING PC 5 | 32 | ◯ |
| GENERAL INSPECTION | INSPECTION PC 1 | 33 | ◯ |
| | INSPECTION PC 2 | 34 | ◯ |
| | OVERALL ADJUSTMENT PC | 35 | ◯ |
| | CONVEYOR CONTROLLER 3 | 36 | ◯ |
| PACKAGING | PRODUCTION MANAGING PC 2 | 41 | ◯ |
| | PACKAGING PC 1 | 42 | ◯ |
| | PACKAGING PC 2 | 43 | ◯ |
| | CONVEYOR CONTROLLER 4 | 44 | ◯ |

NETWORK ADDRESS

FIG. 4

MANUFACTURING LINE COMPUTER SYSTEM AND NETWORK SETUP METHOD OF THE SAME

BACKGROUND

The present disclosure relates to a manufacturing line computer system and a network setup method thereof, and more particularly, to setup of a computer system network arranged along manufacturing lines.

Recent years have seen a number of computers arranged along manufacturing lines in manufacturing plants that manufacture a variety of goods. Some of these computers are connected, for example, to manufacturing robots to control these robots, others are used to record production logs of goods, and still others are used to write necessary data to information apparatuses, manufactured goods. These computers are connected to a network for communication with other computers as occasion demand.

SUMMARY

At the time of erection of manufacturing lines and addition of new lines, it is necessary to arrange a number of computers along the manufacturing lines as described above and set up each computer for networking correctly so that data communication can be exchanged between the computers as intended. However, this task is often complicated and time-consuming.

The present disclosure has been devised in light of the foregoing, and it is desirable to provide a manufacturing line computer system and a network setup method thereof that allow for easy and reliable network setup of computers arranged along manufacturing lines.

According to an embodiment of the present disclosure, there is provided a manufacturing line computer system that includes first and second computers. The first computer includes a storage section and a reply section. The storage section stores a template that associates role information of the second computer and a network address of the second computer. The reply section returns the network address of the second computer associated with the role information to the second computer in response to reception of the role information from the second computer. The second computer includes an input section, a transmission section, and a network address setup section. The input section inputs the role information of the second computer. The transmission section sends the input role information of the second computer to the first computer. The network address setup section specifies the network address returned from the first computer, for the second computer.

According to another embodiment of the present disclosure, there is provided a network setup method of a manufacturing line computer system. The manufacturing line computer system includes first and second computers. The network setup method includes a step of inputting role information of the second computer to the second computer. The network setup method further includes a step of sending the input role information of the second computer from the second computer to the first computer. The network setup method still further includes a step of referring to a template that associates role information of the second computer and a network address of the second computer on the first computer and acquiring the network address of the second computer associated with the received role information. The network setup method still further includes a step of returning the acquired network address of the second computer to the second computer. The network setup method still further includes a step of specifying the network address, returned from the first computer, for the second computer.

DETAILED DESCRIPTION OF THE PREFERRED EMBODIMENT

A detailed description will be given below of an embodiment of the present disclosure with reference to drawings.

Figure 1:
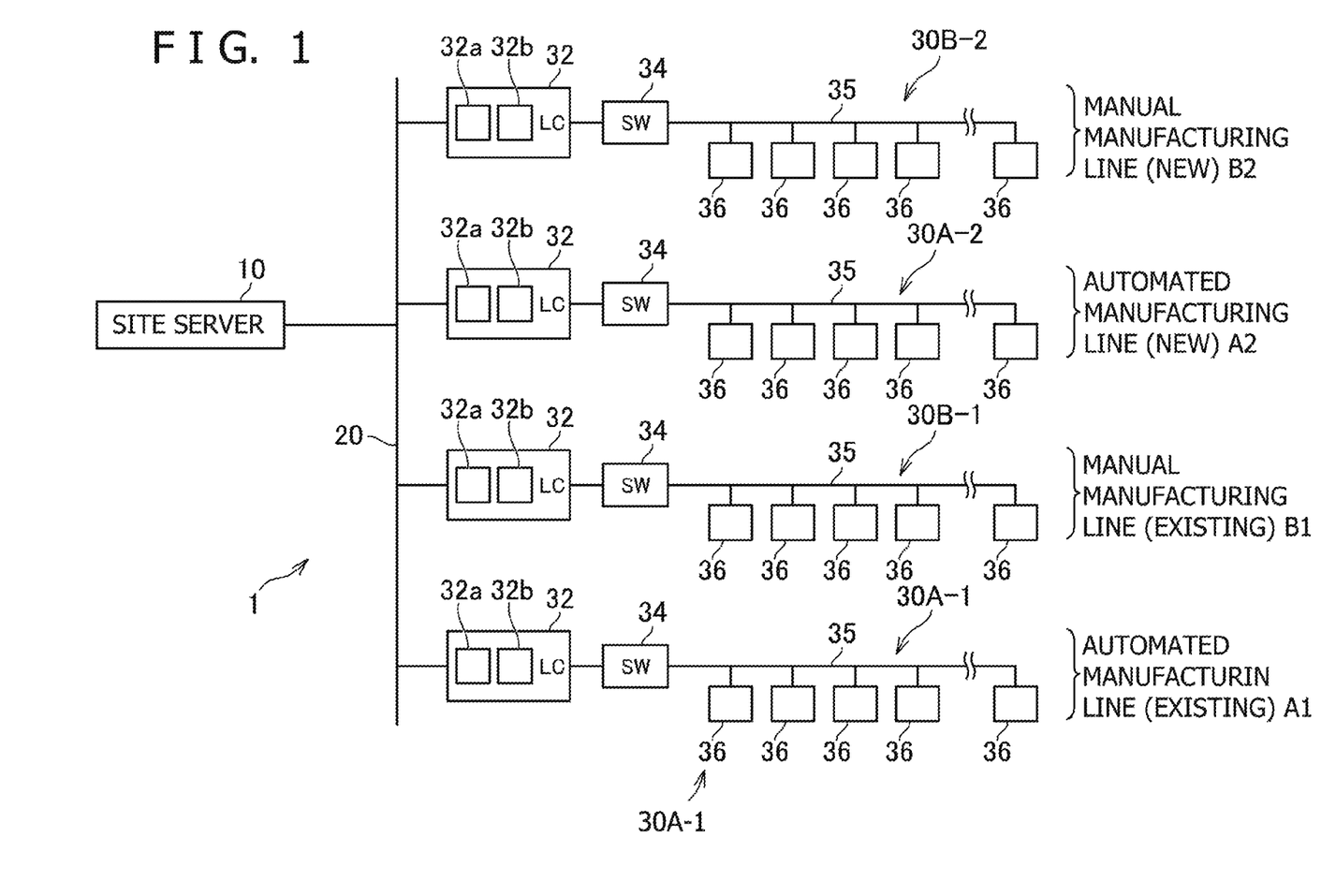
FIG. 1 is an overall configuration diagram of a manufacturing plant computer system according to an embodiment of the present disclosure.

FIG. 1 is an overall configuration diagram of a manufacturing plant computer system 1 according to the present embodiment. The manufacturing plant computer system 1 depicted in FIG. 1 is installed in a manufacturing plant that manufactures information apparatuses such as game consoles and includes a site server 10. The site server 10 is a server computer that manages the manufacturing plant computer system 1 as a whole.

There are provided, for example, four manufacturing lines in this manufacturing plant. We assume here that an automated manufacturing line A1 and a manual manufacturing line B1 are in place as existing manufacturing line. We also assume that an automated manufacturing line A2 and a manual manufacturing line B2 will be newly added.

A manufacturing line computer system 30A-1 is in place for the existing automated manufacturing line A1, and a manufacturing line computer system 30B-1 is in place for the existing manual manufacturing line B1. Also, a manufacturing line computer system 30A-2 will be in place for the new automated manufacturing line A2 which will be added, and a manufacturing line computer system 30B-2 will be in place for the new manual manufacturing line B2 which will be added. Both of the automated manufacturing lines A1 and A2 manufacture goods of the same kind through the same processes (robot-based automated processes). Similarly, both of the manual manufacturing lines B1 and B2 manufacture goods of the same kind through the same processes (manual labor-oriented processes).

The manufacturing line computer system 30A-1 includes a line controller 32 (first computer), a server computer, and a number of plant apparatuses 36 (second computer) that are connected to the line controller 32 via a switching hub 34, thereby forming a manufacturing line network 35. The line controller 32 includes a NAT (Network Address Translation) function 32a and a DHCP (Dynamic Host Configuration Protocol) server function 32b. The line controller 32 is also connected to the site server 10 via a management network 20.

Each of the plant apparatuses 36 includes a computer. Among examples of computers incorporated in the plant apparatuses 36 are those connected to robot arms to control the robot arm, those connected to label printers to control the label printers, those for writing data to information apparatuses, manufactured goods, those for recording production logs, those for conducting various inspections, those for controlling conveyors for transporting manufactured goods, those connected to cameras to control the cameras, and those for analyzing camera images. Apparatuses adequate for the processes carried out in the automated manufacturing line A1 are employed as the plant apparatuses 36.

The switching hub 34 supports a subnet-based VLAN (Virtual Local Area Network). The subnet-based VLAN ensures that the plant apparatuses 36 that belong to the same subnet belong to the same VLAN. This permits data circulation only within the same VLAN. The manufacturing line network 35 may be constituted a single VLAN or a plurality of VLANs. Each of the plant apparatuses 36 belongs to at least one VLAN that is selected to suit the role thereof. As a result, the plant apparatuses 36 having the same role belong to the same VLAN, thereby allowing for efficient circulation of data in the manufacturing line network 35.

As described above, both the automated manufacturing lines A1 and A2 manufacture the same kind of goods through the same processes. Therefore, the manufacturing line computer system 30A-2 has the same apparatus configuration as the manufacturing line computer system 30A-1. On the other hand, the manual manufacturing line B-1 manufactures the same kind of goods through different processes. Therefore, the manufacturing line computer system 30B-1 has a different configuration from that of the manufacturing line computer system 30A-1. Specifically, the manufacturing line computer systems 30B-1 and 30A-1 are common in that they have the line controller 32 and the switching hub 34, but differ in at least either the number or type of plant apparatuses 36. It should be noted that because both of the manual manufacturing lines B-1 and B-2 manufacture the same kind of goods through the same processes as described above, the manufacturing line computer system 30B-2 has the same apparatus configuration as the manufacturing line computer system 30B-1.

The line controller 32 includes the NAT function 32a as described above, and as a result, translation of IP (Internet Protocol) addresses takes place between each of the plant apparatuses 36 of the manufacturing line network 35 and the management network 20. In each of the manufacturing line networks 35, therefore, an arbitrary IP address can be specified for each of the plant apparatuses 36 and the line controller 32. Here, the same group of IP addresses are specified for the manufacturing line computer systems 30A-1 and 30A-2 by using a template which will be described later. Similarly, the same group of IP addresses are specified for the manufacturing line computer systems 30B-1 and 30B-2. Specifically, the same IP address is specified for the plant apparatuses 36 having the same role.

Figure 2:
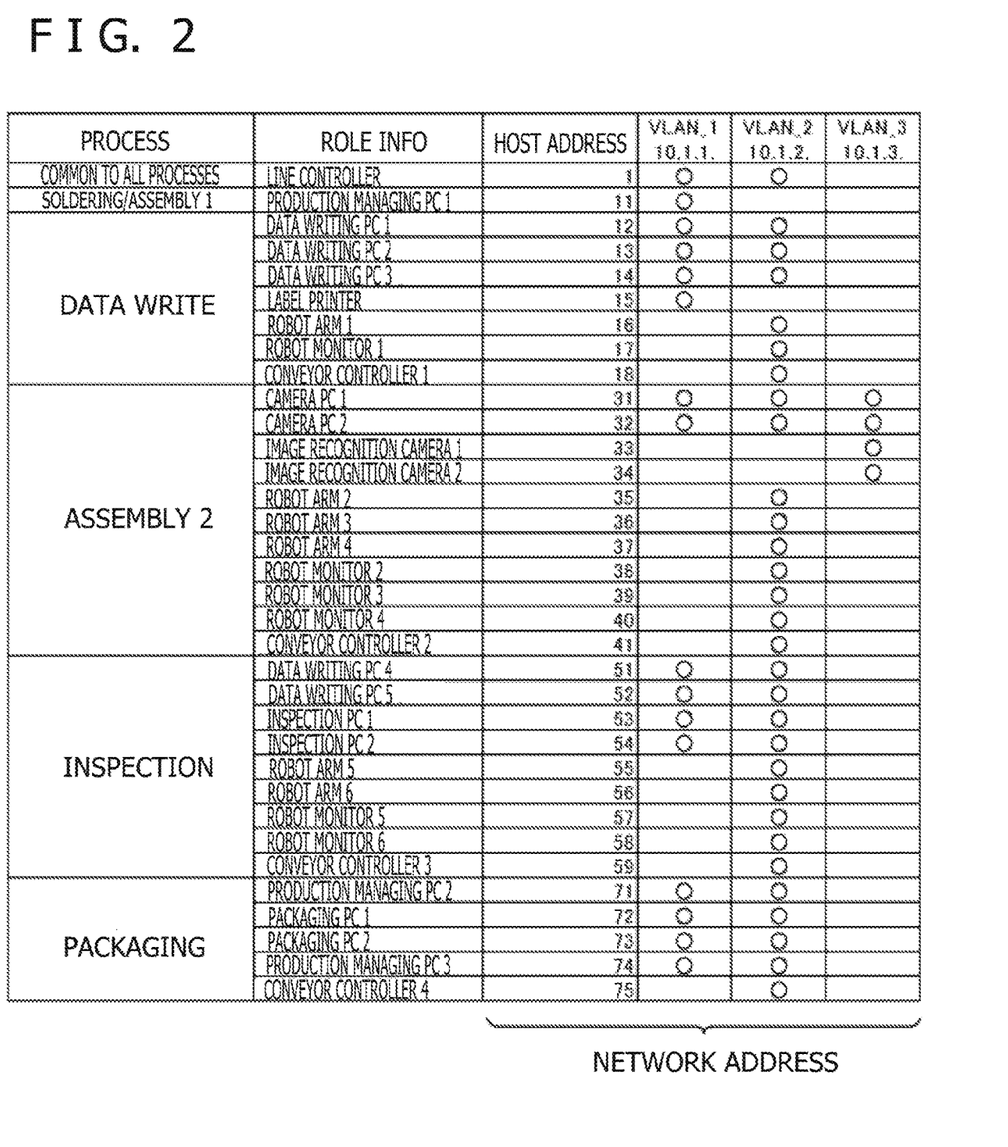
FIG. 2 is a diagram illustrating an example of a template used to specify addresses for apparatuses of a manufacturing line computer system.
Figure 3:
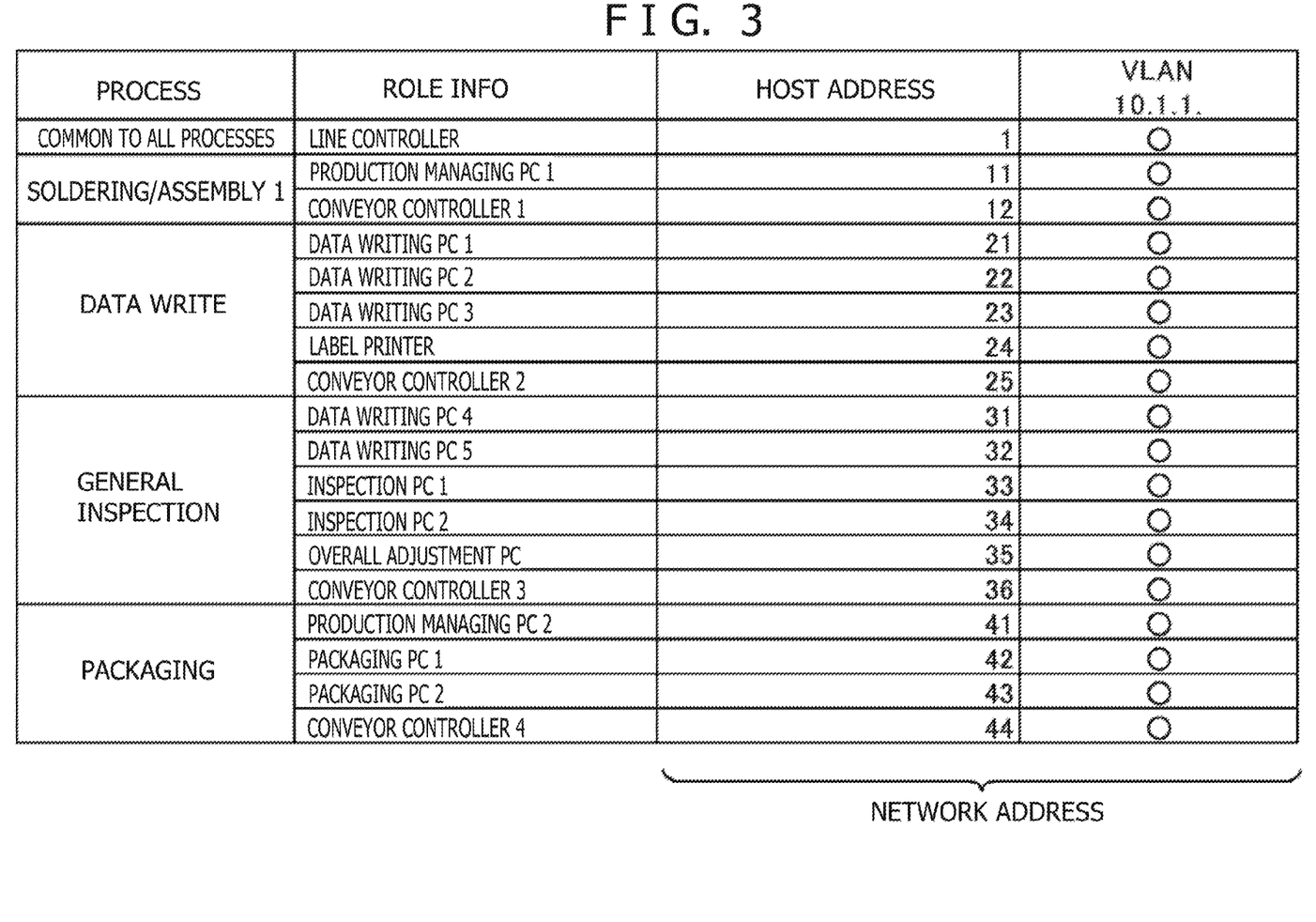
FIG. 3 is a diagram illustrating another example of a template used to specify addresses for apparatuses of the manufacturing line computer system.

FIGS. 2 and 3 illustrate examples of templates designed for address setup. The template depicted in FIG. 2 has been prepared for automated manufacturing lines and applied to the manufacturing line computer systems 30A-1 and 30A-2. The template depicted in FIG. 3 has been prepared for manual manufacturing lines and applied to the manufacturing line computer systems 30B-1 and 30B-2.

As depicted in FIG. 2, a table includes role information and network addresses. The role information indicates the role of each of the plant apparatuses 36 (computers) such as "PRODUCTION MANAGING PC 1" and "ROBOT ARM 2." Although the role information is a descriptive word for ease of comprehension here, it may be one of a variety of symbols. A network address includes a host address and a subnet address. VLAN_1, VLAN_2, and VLAN_3 are available for the manufacturing line networks 35 of the automated manufacturing lines. Subnet address "10.1.1" is assigned to VLAN_1, subnet address "10.1.2" is assigned to VLAN_2, and subnet address "10.1.3" is assigned to VLAN_3. In the template, a circle indicates to which VLAN the plant apparatus 36 with each role belongs. For example, the plant apparatus 36 with a role of "PRODUCTION MANAGING PC 1" belongs to VLAN_1, and the subnet address thereof is "10.1.1." Because the host address of the same plant apparatus 36 is "11," the network address thereof is "10.1.1.11." Also, the plant apparatus 36 with a role of "DATA WRITING PC 1" belongs to VLAN_1 and VLAN_2, and the subnet addresses thereof are "10.1.1" and "10.1.2." Because the host address of the same plant apparatus 36 is "12", the network addresses thereof are "10.1.1.12" and "10.1.2.12." That is, two network addresses are assigned.

In contrast, the table depicted in FIG. 3 has been prepared for manual manufacturing lines and has, therefore, a small number of roles, i.e., plant apparatuses 36. Also, there is only one VLAN.

A description will be given here of building of a system according to the present embodiment by taking, as an example, tasks undertaken to build the manufacturing line computer system 30A-2 for the automated manufacturing line A2. The line controller 32 is connected to the management network 20, followed by the connection of the switching hub 34 to the line controller 32, to build the manufacturing line computer system 30A-2. Further, the plant apparatuses 36 necessary for the manufacturing line A-2 are arranged and, connected to the switching hub 34.

Figure 4:
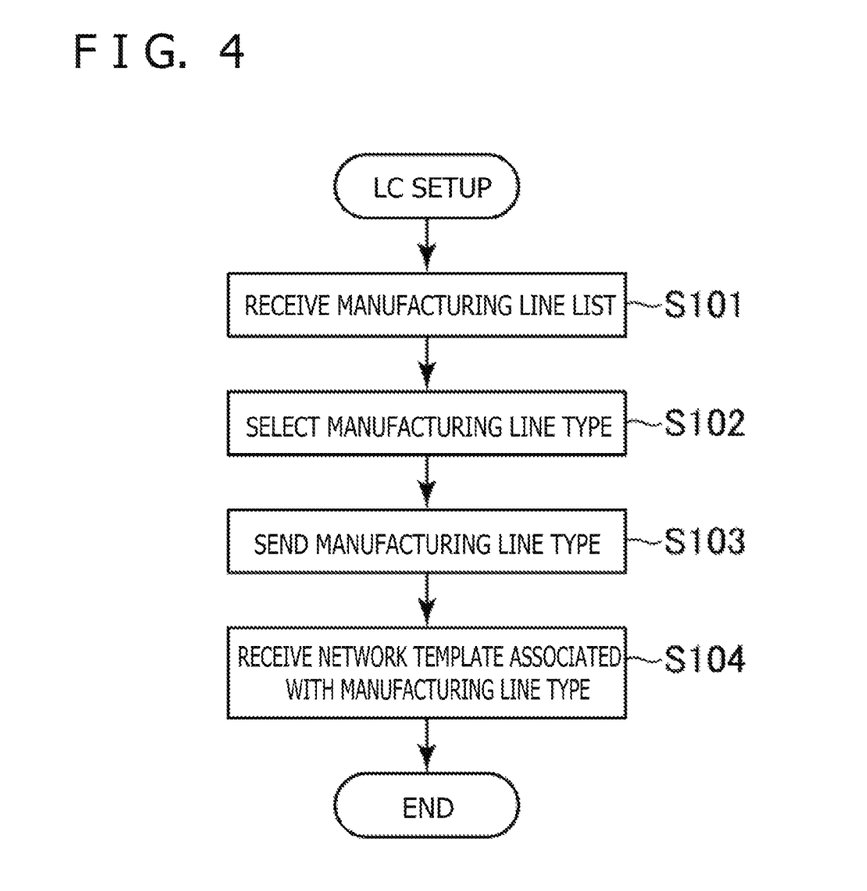
FIG. 4 is a flowchart illustrating a network setup program executed on a line controller.

Next, a network setup program for line controller according to an embodiment of the present disclosure is started in the line controller 32. FIG. 4 is an operational flowchart of this network setup program. As depicted in FIG. 4, when the network setup program is started, the line controller accesses the site server 10 first and acquires a manufacturing line list (S101). The manufacturing line list is a list of manufacturing line types. Here, two types of manufacturing lines, namely, "AUTOMATED MANUFACTURING LINE" and "MANUAL MANUFACTURING LINE" are described in the list.

Next, the line controller 32 displays the manufacturing line list on a display and prompts the user to select a manufacturing line type with an input device such as mouse (S102). Thereafter, the line controller 32 sends the selected manufacturing line type ("AUTOMATED MANUFACTURING LINE" here) to the site server 10 (S103).

The site server 10 returns the template associated with the type received from the line controller 32 (template for automated manufacturing line depicted in FIG. 2 here), and the line controller 32 receives the template (S104). The received template is stored in a local storage device. It should be noted that the IP address indicated in the received template is specified in advance for the line controller 32 as its own IP address in the manufacturing line network 35. For example, according to the template depicted in FIG. 2, IP address "10.1.1.1" is specified for the line controller 32.

Figure 5:
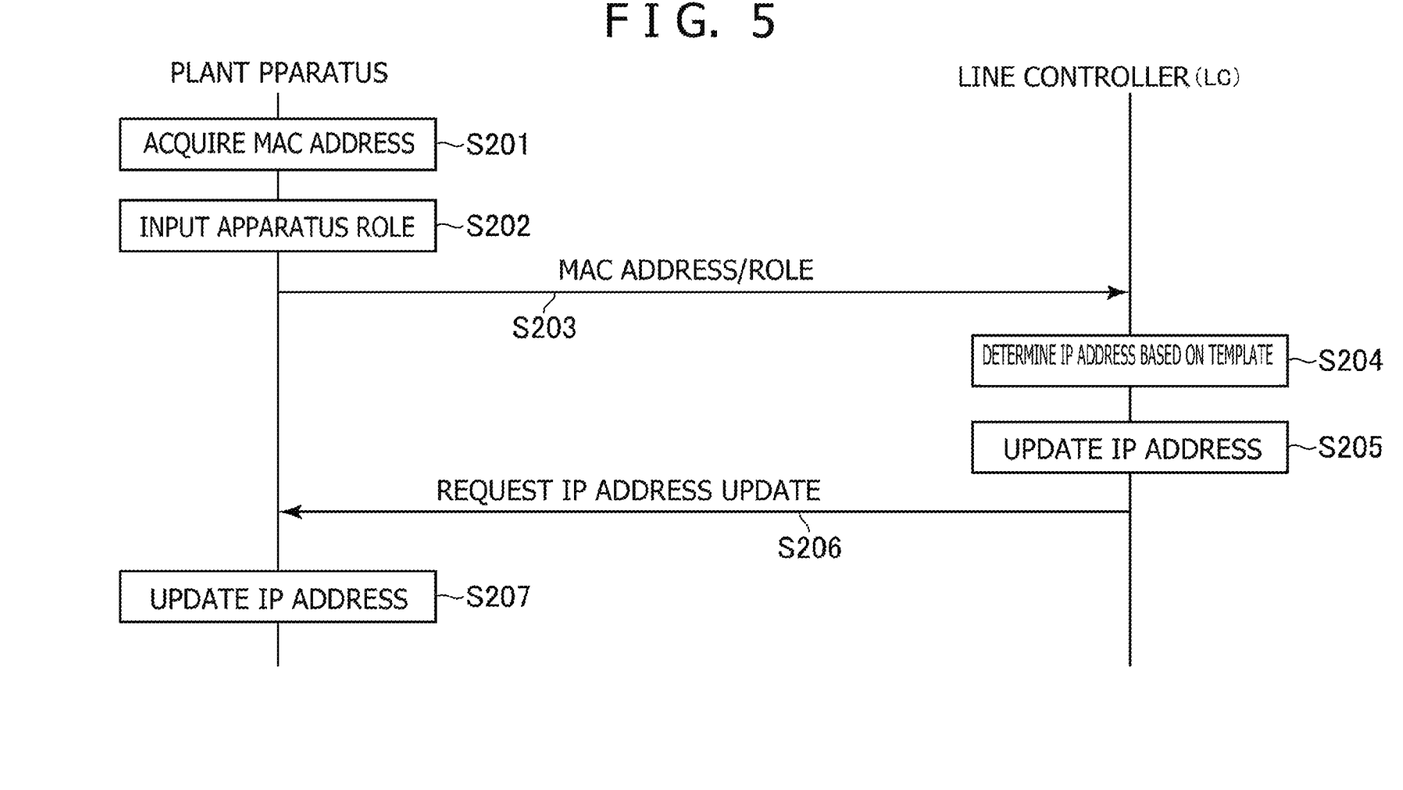
FIG. 5 is a flowchart illustrating processes of a network setup program executed on the plant apparatuses and processes of a support program executed on the line controller.

Thereafter, the line controller 32 starts a network setup support program. Also, each of the plant apparatuses 36 starts a plant apparatus network setup program according to an embodiment of the present disclosure. FIG. 5 is an operational flowchart of the network setup program executed on the plant apparatuses 36 and the support program executed on the line controller 32. It should be noted that the line controller 32 includes the DHCP function 32b, that a temporary IP address is assigned to each of the plant apparatuses 36 in advance, and that the plant apparatuses 36 can communicate with the line controller 32.

As illustrated in FIG. 5, when the plant apparatus network setup program is started in the plant apparatus 36, the plant apparatus 36 acquires its MAC (Media Access Control) address (S201). Also, the plant apparatus 36 displays an input form on its display and prompts the user to input role information regarding the plant apparatus 36 by using physical keys, a touch panel, and so on (S202). Thereafter, the plant apparatus 36 sends the MAC address and role information to the line controller 32 (S203) from the plant apparatus 36.

Because of the support program, the line controller 32 acquires the IP address associated with the received role information (S204) from the template. Also, the line controller 32 changes the IP address, already stored in association with the received MAC address, into the IP address received in S204 (S205). Then, the line controller 32 sends a request to update the IP address to the plant apparatus 36 (S206). The plant apparatus 36 receives the changed IP address from the line controller 32 in response to this update request and changes its own IP address (S207).

The embodiment described above allows for identification of a template based on the manufacturing line type and specification of an IP address for the line controller 32 and the plant apparatuses 36 according to the specified template. This ensures simple and reliable specification of IP addresses. Moreover, when a plurality of manufacturing lines are of the same type, the same group of IP addresses are assigned to the line controller 32 and the plant apparatuses 36, thereby facilitating network maintenance tasks.

It should be noted that the support program of the line controller 32 may decide whether or not IP addresses have been assigned to the plant apparatuses 36 having all the roles described in the template and depict the decision result on an output device such as display. This makes it possible to reliably decide whether or not all the plant apparatuses 36 are in place at the manufacturing line A2 and have been set up for networking.

The present disclosure contains subject matter related to that disclosed in Japanese Priority Patent Application JP 2017-093603 filed in the Japan Patent Office on May 10, 2017, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. A manufacturing line computer system comprising:
a manufacturing line network comprising a manufacturing line controller and at least one plant apparatus having a network address associated with a MAC (Media Access Control) address, said manufacturing line controller including: (i) a memory configured to store the network address in association with the MAC address, and a template that associates a new network address with inputted role information of the plant apparatus, the network address comprising a host address and a subnet address; and (ii) at least one processor configured to return the new network address associated with the role information to the plant apparatus in response to reception of the role information and the MAC address from the plant apparatus; and the plant apparatus including at least one processor configured to: (i) receive the role information as input by prompting a user to input the role information; (ii) send the inputted role information and MAC address to the line controller; (iii) receive the new network address from the line controller based on the role information provided to the line controller; and (iv) update the network address assigned to the plant apparatus to the new network address,
wherein the line controller sends a manufacturing line type to a site server, said manufacturing line type comprising one of an automated manufacturing line and a manual manufacturing line and, in response, the site server returns the template associated with the line type received from the line controller,
wherein the plant apparatus is connected to the manufacturing line controller via a switching hub that supports a subnet-based virtual local area network, and
wherein a subnet address adequate for role information thereof is assigned to the plant apparatus, where the role information defines a role belonging to a role category including at least one (i) data write; (ii) assembly; (iii) inspection and (iv) packaging.

2. The manufacturing line computer system of claim 1, wherein:
the memory further stores a network address of the manufacturing line controller, and
the manufacturing line controller specifies the network address of the manufacturing line controller stored in the memory.

3. The manufacturing line computer system of claim 1, wherein the manufacturing line controller is connected to an upstream network via network address translation.

4. The manufacturing line computer system of claim 1, wherein the manufacturing line controller receives, of a plurality of templates, one associated with the type of the manufacturing line where the manufacturing line controller and plant apparatus are arranged.

5. The manufacturing line computer system of claim 1, wherein said line controller communicates with a plurality of plant apparatuses.

6. The manufacturing line computer system of claim 5, further comprising a plurality of manufacturing line networks.

7. The manufacturing line computer system of claim 6, wherein each of said manufacturing line networks is a Virtual Local Area Network (VLAN).

8. The manufacturing line computer system of claim 7, wherein each plant apparatus is assigned to a VLAN based on its respective role as specified in the role information.

9. The manufacturing line computer system of claim 8, wherein a same IP address is specified for plant apparatuses having the same role.

10. The manufacturing line computer system of claim 1, wherein a temporary IP address is initially assigned to the plant apparatus and said temporary IP address is updated, at the request of the line controller, with the IP address assigned to the plant apparatus based on its specified role.

11. The manufacturing line computer system of claim 1, wherein the subnet address is assigned to a specified VLAN in the manufacturing line network.

12. The manufacturing line computer system of claim 1, wherein the specified VLAN is one of three separate VLANs in the manufacturing line network.

13. The manufacturing line computer system of claim 1, wherein the network address associated with the MAC address is updated to the new network address when the new network address is acquired.

14. A manufacturing line network setup method, the manufacturing line network including a manufacturing line controller and at least one plant apparatus having a network address associated with a MAC (Media Access Control) address, the manufacturing line network setup method comprising:
- a user inputting role information of the plant apparatus in the plant apparatus;
- sending the inputted role information and MAC address of the plant apparatus from the plant apparatus to the manufacturing line controller;
- referring to a template that associates role information of the plant apparatus with a new network address of the plant apparatus in response to receiving the role info and the MAC address;
- acquiring the new network address of the plant apparatus associated with the received role information and updating the network address associated with the MAC address to the new network address, the network address comprising a host address and a subnet address;
- returning the acquired new network address of the plant apparatus to the plant apparatus; and
- updating the network address assigned to the plant apparatus to the new network address, wherein the plant apparatus is connected to the manufacturing line controller via a switching hub that supports a subnet-based virtual local area network, and wherein a subnet address adequate for role information thereof is assigned to the plant apparatus, where the role information defines a role belonging to a role category including at least one of (i) data write; (ii) assembly; (iii) inspection; and (iv) packaging.

15. The network setup method of claim 14, further comprising:
- storing the template that associates role information of the plant apparatus with the network address of the plant apparatus in a memory;
- storing a network address of the manufacturing line controller in the memory; and
- specifying, via the manufacturing line controller, the network address of the manufacturing line controller stored in the memory.

16. The network setup method of claim 14, wherein the manufacturing line controller is connected to an upstream network via network address translation.

17. The network setup method of claim 14, wherein the manufacturing line controller receives, of a plurality of templates, one associated with the type of the manufacturing line where the manufacturing line controller and plant apparatus are arranged.

* * * * *